(12) United States Patent
Costa

(10) Patent No.: US 9,388,025 B2
(45) Date of Patent: Jul. 12, 2016

(54) SHACKLE OR CLEVIS MOUNT FITTING FOR STEEL CABLE AND SYNTHETIC ROPE END LOOPS

(75) Inventor: Michael Douglas Costa, Boise, ID (US)

(73) Assignee: FACTOR 55, LLC, Boise, ID (US)

( * ) Notice: Subject to any disclaimer, the term of this patent is extended or adjusted under 35 U.S.C. 154(b) by 0 days.

(21) Appl. No.: 13/464,487

(22) Filed: May 4, 2012

(65) Prior Publication Data

US 2012/0280523 A1 Nov. 8, 2012

Related U.S. Application Data

(60) Provisional application No. 61/482,916, filed on May 5, 2011.

(51) Int. Cl.
| | | |
|---|---|---|
| *B66C 1/34* | (2006.01) |
| *B66D 1/00* | (2006.01) |
| *F16G 11/02* | (2006.01) |
| *F16G 11/14* | (2006.01) |
| *F16G 15/06* | (2006.01) |
| *F16G 15/08* | (2006.01) |

(52) U.S. Cl.
CPC *B66D 1/00* (2013.01); *F16G 11/02* (2013.01); *F16G 11/146* (2013.01); *F16G 15/06* (2013.01); *F16G 15/08* (2013.01)

(58) Field of Classification Search
CPC .......... F16G 15/06; F16G 11/00; B60D 1/52; B60D 1/06; B60D 1/38; B60D 1/565; B60D 1/07; B60D 1/185; B60D 1/28; B60D 1/58; B60D 1/00; B60D 1/02; B60D 1/04; B60D 1/075; B60D 1/187; B60D 1/30

USPC .................. 24/265 AL; 294/84.11
See application file for complete search history.

(56) References Cited

U.S. PATENT DOCUMENTS

| | | | | |
|---|---|---|---|---|
| 1,222,997 | A * | 4/1917 | Rottmer | 59/86 |
| 1,392,138 | A * | 9/1921 | Freeman et al. | 278/96 |
| 2,275,162 | A * | 3/1942 | Sutthoff | 294/82.11 |
| 2,687,899 | A * | 8/1954 | Bendtsen | 280/504 |
| 2,835,528 | A * | 5/1958 | McCarthy et al. | 294/74 |
| 2,904,906 | A * | 9/1959 | Smith | 37/399 |
| 3,269,109 | A * | 8/1966 | Hart | 59/86 |
| 4,005,904 | A * | 2/1977 | Weman et al. | 297/483 |
| 4,225,172 | A * | 9/1980 | Marquardt | 294/74 |
| 5,058,243 | A * | 10/1991 | Rasmussen | 24/68 R |
| 6,158,760 | A * | 12/2000 | Kiss | 280/491.5 |

(Continued)

FOREIGN PATENT DOCUMENTS

| | | |
|---|---|---|
| GB | 1486067 A | 9/1977 |
| JP | 8-217362 | 8/1996 |

OTHER PUBLICATIONS

PCT International Search Report and Written Opinion mailed on Nov. 23, 2012, for PCT Application No. PCT/US2012/036564, 10 pages.

(Continued)

*Primary Examiner* — Robert J Sandy
*Assistant Examiner* — David Upchurch
(74) *Attorney, Agent, or Firm* — Dorsey & Whitney LLP

(57) ABSTRACT

A shackle mount that is connectable to a standard recovery winch cable. The shackle mount includes a shackle attachment tab that prevents lateral movement of the shackle mount along the shackle pin.

18 Claims, 10 Drawing Sheets

(56) References Cited

U.S. PATENT DOCUMENTS

| | | | |
|---|---|---|---|
| 6,282,879 B1 * | 9/2001 | Bonaiti et al. | 59/86 |
| 6,312,004 B1 * | 11/2001 | Kiss | 280/507 |
| 6,536,794 B2 * | 3/2003 | Hancock et al. | 280/511 |
| 6,948,734 B2 * | 9/2005 | Popham | 280/478.1 |
| 7,393,033 B1 * | 7/2008 | Bisso, IV | 294/82.1 |
| 7,654,594 B2 * | 2/2010 | Bisso, IV | 294/82.35 |
| D615,006 S * | 5/2010 | Goodman et al. | D12/162 |
| D615,844 S * | 5/2010 | Wiora | D8/343 |
| 7,871,097 B2 | 1/2011 | Sparkes et al. | |
| 8,328,223 B2 * | 12/2012 | Leinenger | 280/504 |
| 2004/0227324 A1 * | 11/2004 | Popham | 280/478.1 |
| 2005/0279977 A1 | 12/2005 | Kerry | |
| 2006/0087101 A1 * | 4/2006 | Yon | 280/504 |
| 2006/0103111 A1 | 5/2006 | Popham | |
| 2009/0008953 A1 * | 1/2009 | Bisso, IV | 294/82.17 |
| 2010/0011678 A1 * | 1/2010 | Kelly | 52/125.5 |
| 2010/0281656 A1 * | 11/2010 | Naquin et al. | 24/127 |

OTHER PUBLICATIONS

EP Extended Search Report dated Dec. 4, 2014, for EP 12779382, 9 pages.

* cited by examiner

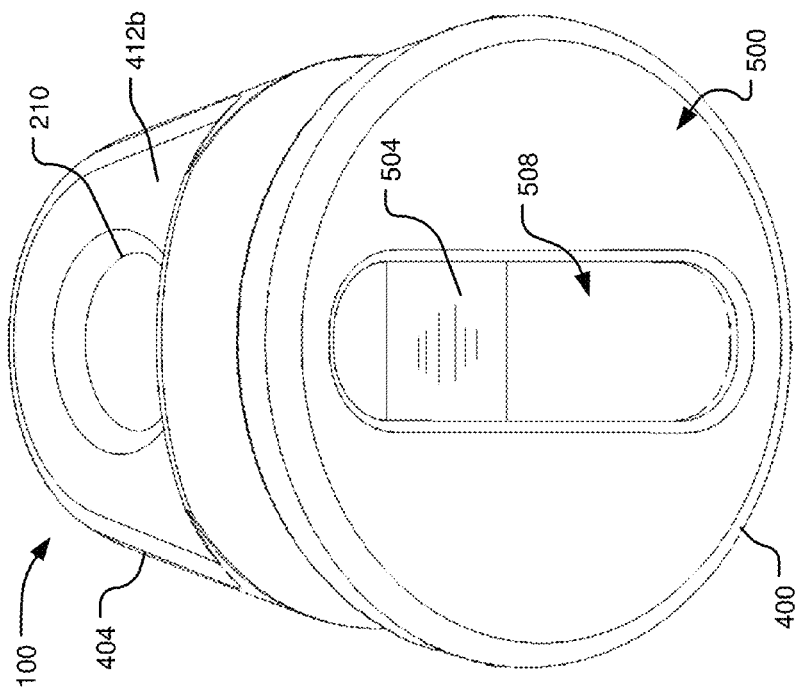
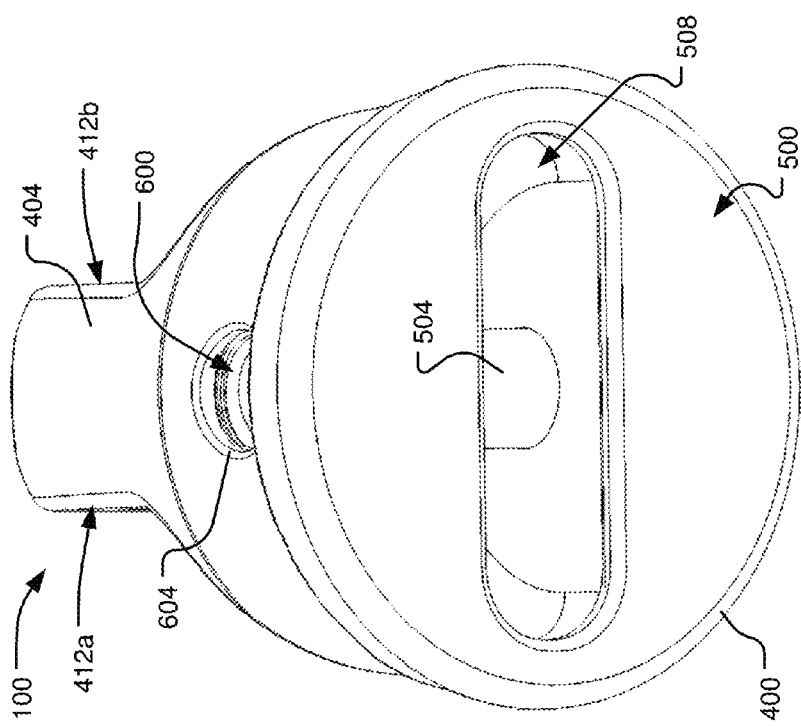

SHACKLE OR CLEVIS MOUNT FITTING FOR STEEL CABLE AND SYNTHETIC ROPE END LOOPS

CROSS-REFERENCE TO RELATED APPLICATIONS

This application claims priority to U.S. Provisional Patent Application No. 61/482,916, filed May 5, 2011, and entitled, "Shackle or Clevis Mount Fitting for Steel Cable and Synthetic Rope End Loops," which is incorporated herein by reference in its entirety and for all purposes.

TECHNICAL FIELD

Embodiments discussed herein generally relate to rigging and/or to vehicle recovery. Embodiments discussed herein include shackle mount fittings that connect to steel cable or synthetic rope recovery lines used in recovery winches.

BACKGROUND

Many off road vehicles are presently equipped with electric or hydraulic recovery winches. These winches allow the vehicle owner to extract the vehicle out of a ditch or other hazard in which the vehicle may be stuck. Typically, a winch has a recovery line that terminates in a loop end, which accepts a common recovery hook. The recovery hook provides a connection point for a towing strap. A typical recovery winch may come equipped with the hook already attached to the cable loop. The hook is typically connected to the loop by a shear pin and cotter pin.

A drawback of the hook is that the opening of the hook may allow the towing strap or chain to come out of the opening. Additionally, the standard hook opening is not large enough to simultaneously hold two ends of a typical recovery strap. Although some hooks are equipped with a safety latch that prevents the mating rope or strap from coming loose from the hook, these latches are weak and are not designed to accept high loads.

In recent years it has been a common practice to replace the typical recovery hook with a pin or bolt type shackle. The larger opening and positive pin closing feature of a shackle avoids some of the problems associated with a recovery hook. Nevertheless, use of a shackle in this way is not without drawbacks of its own. The present disclosure identifies ways in which use of a shackle in this way may be problematic. The present disclosure additionally includes a winch attachment directed to avoiding these identified problems, as wells as gaining other advantages.

SUMMARY

Embodiments discussed herein are directed to a shackle mount that is connectable to a standard recovery winch cable. The shackle mount includes a shackle attachment tab that prevents lateral movement of the shackle mount along the shackle pin.

In various aspects, the present disclosure relates to a recovery winch attachment, comprising a base having a fairlead engagement surface and a void space within the base, the void space defined on one side by a plane established by the fairlead engagement surface; a shear pin configured to retain a recovery line at least partially within the void space of the base; and a shackle attachment tab connected to the base and extending outwardly from a side of the base opposite from that of the fairlead engagement surface.

In some embodiments, the shackle attachment tab comprises a first shackle engagement surface substantially perpendicular to the plane established by the fairlead engagement surface; and a second shackle engagement surface substantially parallel to the first shackle engagement surface; a mounting hole that extends between the first and second shackle engagement surfaces through a thickness of the shackle attachment tab, the mounting hole configured to receive a shackle pin of a shackle.

In some embodiments, the thickness of the shackle attachment tab substantially corresponds to a distance between first and second shackle pin eyelets of the shackle.

In some embodiments, the first shackle engagement surface is configured to be flush with a surface of a first shackle pin eyelet of the shackle when the mounting hole receives the shackle pin; and the second shackle engagement surface is configured to be flush with a surface of a second shackle pin eyelet of the shackle when the mounting hole receives the shackle pin.

In some embodiments, the shear pin is parallel to the first and second shackle engagement surfaces.

In some embodiments, the recovery line terminates in a loop that encircles the shear pin.

In some embodiments, the shear pin sits in a shear pin cavity within the base, the shear pin cavity intersecting with the void space at substantially a right angle.

In some embodiments, one side of the shear pin cavity terminates at an opening in the base such that the shear pin may be removed from the shear pin cavity through the opening in the base.

In some embodiments, the recovery winch attachment further comprises a removable cotter pin set within the shear pin cavity between the shear pin and the opening in the base such that the shear pin is retained within the shear pin cavity.

In some embodiments, the recovery winch attachment further comprises a padding attached to the base at the fairlead engagement surface, the padding having a hole through which the recovery line passes.

In some embodiments, the base and shackle attachment tab are integrally formed as a single piece of homogenous material.

In some embodiments, the base is cylindrical and the fairlead engagement surface is circular.

In some embodiments, a diameter of the fairlead engagement surface is at least twice as large as a fairlead opening.

In various aspects, the present disclosure relates to a recovery winch attachment, comprising a base having a fairlead engagement surface; a recovery line retention mechanism within the base and recessed from a plane established by the fairlead engagement surface; and a shackle attachment tab connected to the base and configured to receive a shackle pin of a shackle through a mounting hole that extends through a thickness of the shackle attachment tab, the thickness of the shackle attachment tab substantially corresponding to a distance between a first and second shackle pin eyelets of the shackle.

In some embodiments, the shackle attachment tab comprises a first shackle engagement surface substantially perpendicular to the plane established by the fairlead engagement surface, the first shackle engagement surface configured to be flush with a surface of the first shackle pin eyelet when the mounting hole receives the shackle pin; and a second shackle engagement surface substantially parallel to the first shackle engagement surface, wherein the mounting hole extends between the first and second shackle engagement surfaces, the second shackle engagement surface configured to be flush with a surface of the second shackle pin eyelet when the mounting hole receives the shackle pin.

In some embodiments, the recovery line retention mechanism comprises a shear pin configured to retain the recovery line at least partially within a void space of the base, the void space defined on one side by a plane established by the fairlead engagement surface, wherein the recovery line terminates in a loop that encircles the shear pin.

In some embodiments, the recovery line retention mechanism comprises an integral machined boss configured to retain the recovery line at least partially within a void space of the base, the void space defined on one side by a plane established by the fairlead engagement surface, wherein the recovery line terminates in a loop that encircles the integral machined boss.

In various aspects, the present disclosure relates to an apparatus, comprising a base having a planar engagement surface; a retention mechanism within the base and recessed from the plane of the engagement surface; and an attachment tab connected to the base and extending outwardly from a side of the base opposite from that of the planer engagement surface.

In some embodiments, the attachment tab further comprises a mounting hole that extends through a thickness of the attachment tab.

In some embodiments, the retention mechanism further comprises a shear pin set within a void space of the base, the void space defined on one side by the plane of the engagement surface.

BRIEF DESCRIPTION OF THE DRAWINGS

FIGS. 11A and 11B are isometric views of an embodiment of a recovery winch attachment in which a planar orientation of the shackle attachment tab is a aligned with and contains a longitudinal axis of the shear pin.

DETAILED DESCRIPTION

Figure 1:
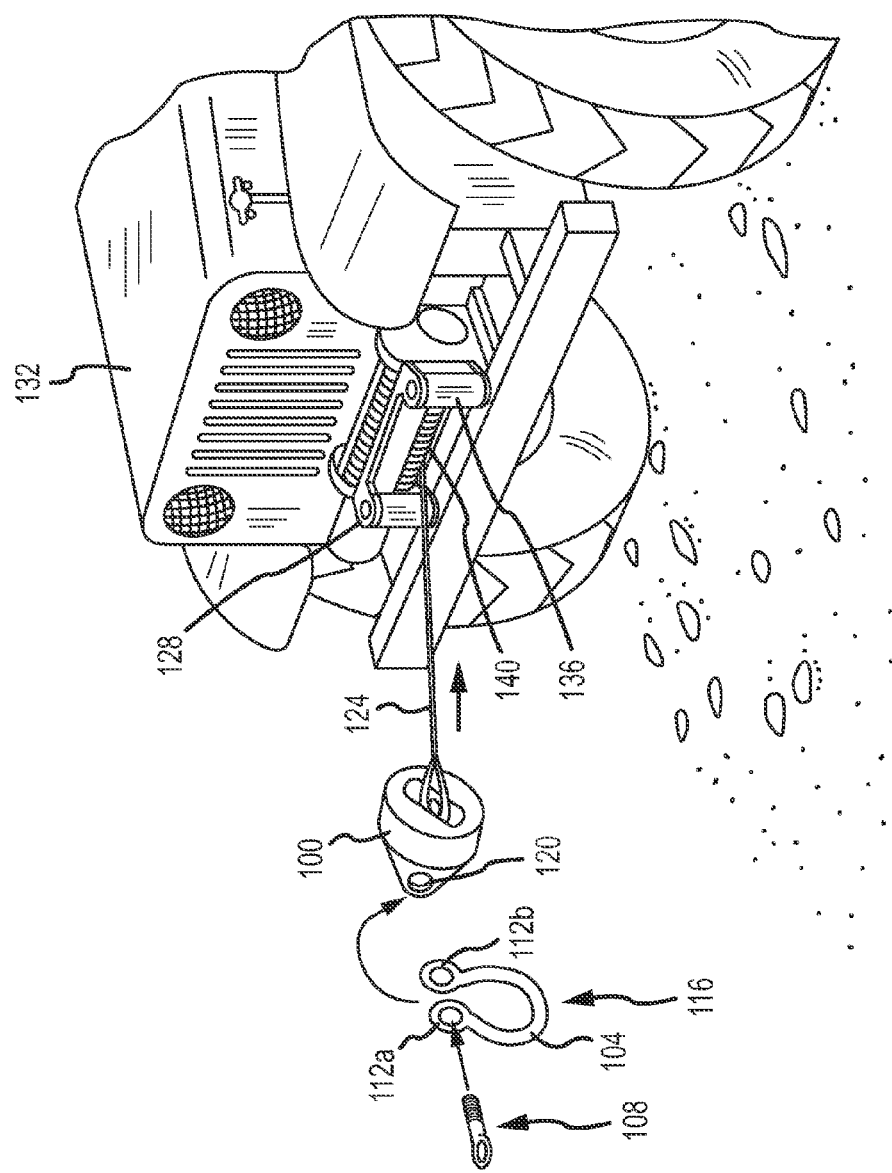
FIG. 1 is an illustration of a general operating environment showing a recovery winch attachment embodiment that is discussed herein.

FIG. 1 is an illustration of a general operating environment showing an embodiment discussed herein. FIG. 1 includes a recovery winch attachment generally identified with reference numeral 100. A recovery winch attachment 100 in accordance with embodiments discussed herein is connectable to a shackle 104. The shackle 104 includes a u-shaped portion 116 that terminates on each side in shackle pin eyelets 112a,b. The shackle 104 may be positioned on the recovery winch attachment 100, such that the shackle pin eyelets 112a,b align with a mounting hole 120 in the recovery winch attachment 100. A shackle pin 108 may then be threaded through the shackle pin eyelets 112a,b and through the mounting hole 120 to thereby retain the shackle 104 in place.

The recovery winch attachment 100 is additionally connectable to a recovery line 124. The recovery line 124 is associated with a recovery winch 128 mounted on the front end of an off-road vehicle 132, such as an all-terrain vehicle, truck, sport-utility-vehicle, utility task vehicle, and the like. The recovery winch may be electric or hydraulic, for example. The recovery line 124 may be rolled up or otherwise retained on the fairlead 136 and is capable of being extended or otherwise unrolled from the fairlead 136 through a fairlead opening 140. FIG. 1 shows a typical recovery winch 128 with a mounted roller fairlead 136. Hawse fairleads are typically used in synthetic rope applications and do not include rollers, but instead are a solid piece of material with an annular slot opening. The embodiments discussed herein are designed to work with both of these types of fairleads.

The recovery winch 128 may utilize a wire rope, cable or synthetic rope coiled around a drum with the free end formed into a loop. As used herein, a "recovery line" refers to any of these possible implementations. Further, all references to wire rope will be referred to as "cable" and all shackles or devises will be referred to as "shackles". The loop formed at the free end of the recovery line 124 may be a simple swage sleeve terminated end. Alternatively, the loop may be a woven loop or a loop eye may be formed around a typical thimble. The loop is fed through a fairlead (roller or Hawse) portion of the recovery winch. Typically, the loop end of the rope or cable accepts a common recovery hook. A recovery winch attachment 100, in accordance with embodiments discussed herein, is adapted to connect to a standard recovery line 124 in place of the common recovery hook.

Figure 2A:
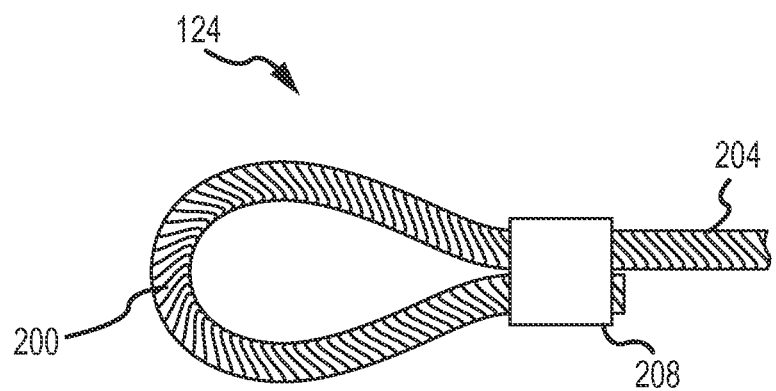
FIG. 2a and FIG. 2b illustrate steel cable recovery lines that may used with the recovery winch attachment shown in FIG. 1.
Figure 2B:
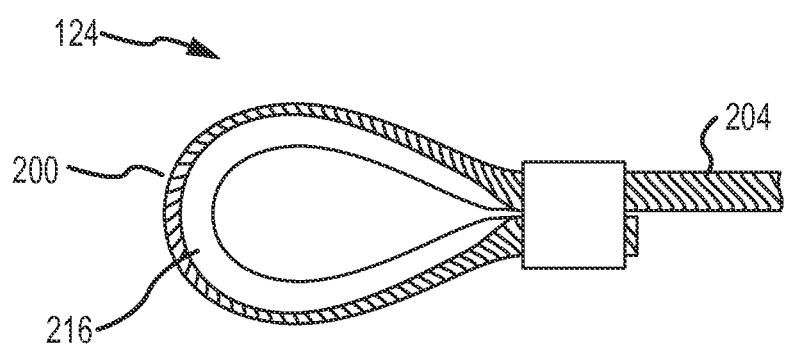

FIG. 2A and FIG. 2B illustrate recovery lines that are made from steel cable. FIG. 2A is an illustration of a steel cable recovery line 124 that includes a mainline portion 204. The mainline portion 204 terminates into a loop end 208. The loop end 208 extends from the mainline 204 and loops onto itself and back into engagement with the mainline 204 at which point the end of the recovery line 204 is attached to the mainline 204 with a clamp 210.

FIG. 2B includes an alternative configuration for a steel cable recovery line 124. In FIG. 2B, the mainline 204 of the recovery line cable 124 again terminates in a loop end 200, which is attached to the mainline 204 through a clamp 208. Additionally, the cable 124 shown in FIG. 2B includes a thimble 216 disposed on the inside of the loop end 208. The thimble 216 is adapted to provide protection to the loop end 208 by providing a strengthened or otherwise enhanced connection between the loop end 208 and a retention mechanism of the recovery winch attachment 100 which connects to the recovery line 204.

Figure 3A:
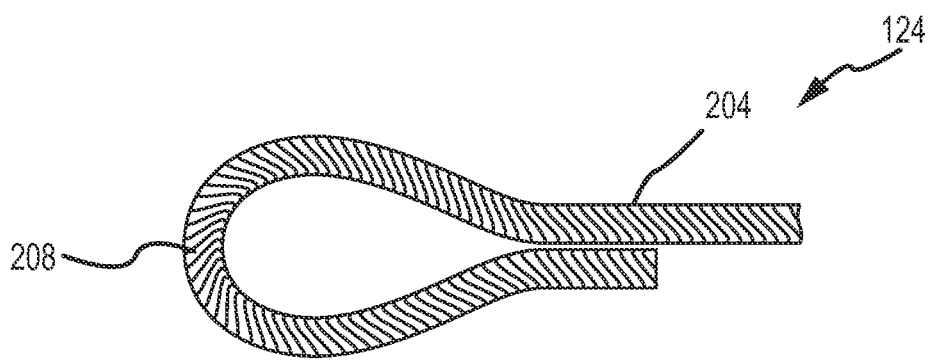
FIG. 3a through FIG. 3c illustrate synthetic rope recovery lines that may used with the recovery winch attachment shown in FIG. 1.
Figure 3B:
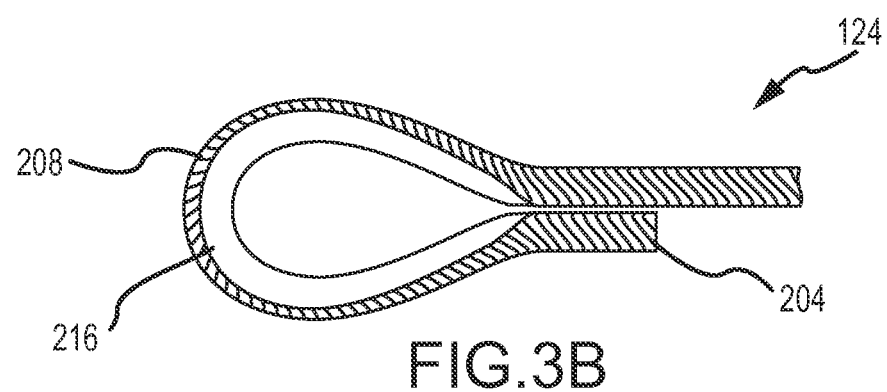
Figure 3C:
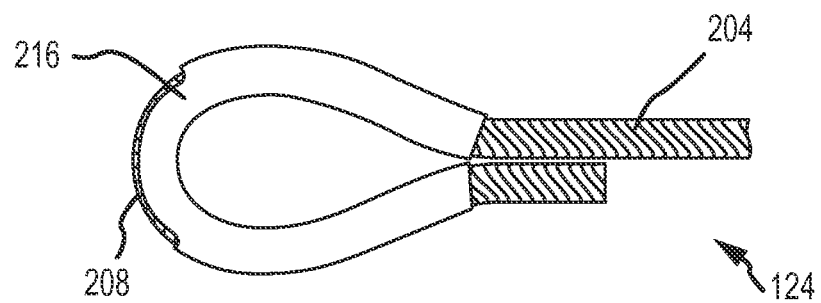

FIG. 3A through FIG. 3C illustrate synthetic rope recovery lines 124. FIG. 3A illustrates a synthetic rope recovery line having a mainline portion 204 that terminates in a loop end 208 that loops on itself and is woven back into the main line 204. FIG. 3B includes a synthetic rope recovery line that includes a mainline 204 that terminates in a loop end 208. The recovery line 124 shown in FIG. 3B includes a protective thimble 216. The recovery line 124 shown in FIG. 3C additionally include a mainline 204 that terminates in a loop end 208. The loop end 208 shown in FIG. 3C is protected by a thimble 216 in accordance with an alternative configuration.

Thus, FIG. 2A and FIG. 2B show a typical loop end of a steel cable with and without a thimble 216. FIG. 3A through FIG. 3B shows a typical loop end of a synthetic rope with and without a thimble 216. FIG. 3A through FIG. 3B also show how the loose end of a synthetic rope is woven back into the main rope 204 to create the loop 208. These are the type of loops 208 with which a recovery winch attachment 100 in accordance with embodiments discussed herein may interface. As described in greater detail in connection with FIGS. 5, 11A, and 11B, the loop 208 may be retained within recovery winch attachment 100 by a retention mechanism that includes a shear pin or other retention member that is threaded through the loop 208.

Figure 4:
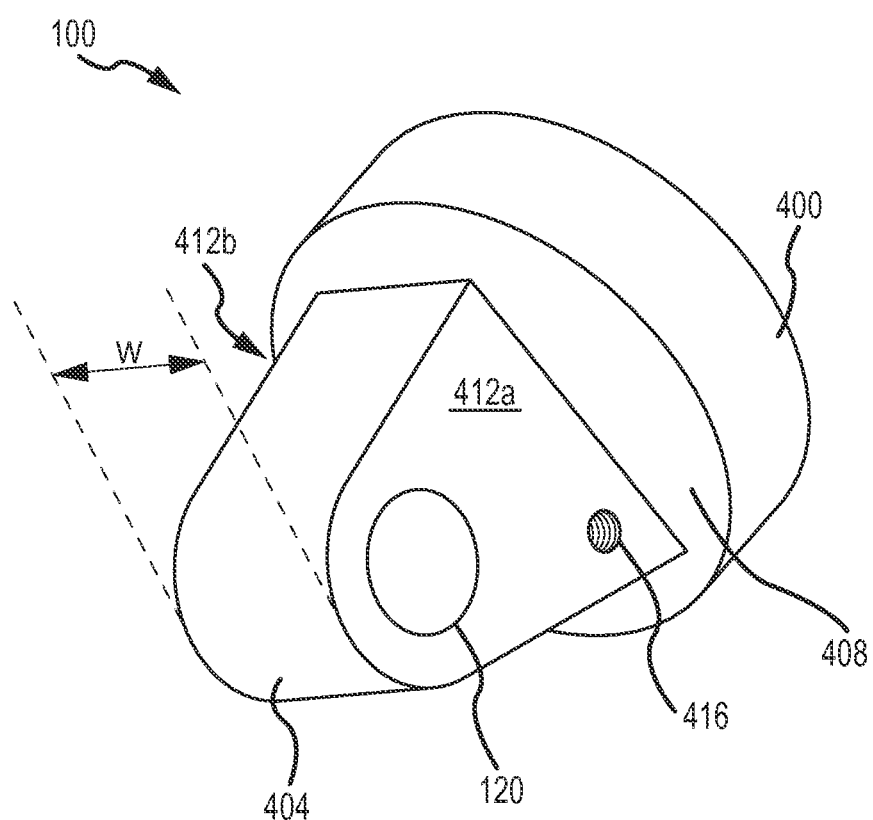
FIG. 4 is a perspective view of the recovery winch attachment shown in FIG. 1.

FIG. 4 is an isometric illustration of the recovery winch attachment 100 shown in FIG. 1. The recovery winch attachment 100 shown in FIG. 4 includes a base 400 connected to a shackle attachment tab 404. The shackle attachment tab 404 provides the mounting hole 120 that is adapted to receive a standard pin or bolt shackle 104. The shackle attachment tab 404 may be shaped differently as long as it provides a mounting hole 120 or slot for the shackle 104 to pivot around. The shackle attachment tab 404 and base 400 may also incorporate a secondary mounting feature 416 to include the mounting of a hook. In one embodiment, the secondary mounting feature is a thinned out portion of the shackle attachment tab 404 configured to accept a small shear pin for a standard hook. The base 400 provides a retention mechanism to attach the cable or rope loop 208 and also functions a stop for the fairlead 136. The base 404 may be circular, hexagonal, and spherical or have any other shape as long as it is larger than the slot opening of a standard fairlead 136 and therefore cannot slip through the fairlead opening 140. The base 400 and shackle attachment tab 404 may be of one homogeneous material or multi-pieces fastened or welded together. Materials may be aluminum, steel, iron, titanium or other materials that can with stand typical vehicle recovery loads.

The shackle attachment tab 404 is connected to the base 400 at a first side 408 of the base. The shackle attachment tab 100 is connected to the first surface 408 and extends outwardly therefrom. The mounting hole 120 is located at a distal end of the shackle attachment tab 404. The shackle attachment tab 404 includes a first shackle engagement surface 412a, and a second shackle attachment surface 412b opposite from the first shackle engagement surface 412a. The first and second shackle engagement surfaces 412a,b are substantially perpendicular to a plane defined by the first surface 408 of the base 400. The mounting hole 120 extends through a width W of the shackle attachment tab 404 between the first shackle engagement surface 412a and the second shackle engagement surface 412b.

The thickness W of the shackle attachment tab 404 is such that when the shackle 104 is attached to the shackle attachment tab 404, the shackle engagement surfaces 412a and 412b are in contact or in close proximity to the shackle 104. Specifically, a surface of the first shackle pin eyelet 112a is flush, or nearly flush, with the first shackle engagement surface 412a. Similarly, a surface of the second shackle pin eyelet 112b is flush, or nearly flush, with the second shackle engagement surface 412b. Said another way, the width W of the shackle attachment tab 404 extends between the first and second shackle pin eyelets 112a,b. Because the width W of the shackle pin attachment 404 extends between the first and second shackle pin eyelets 112a,b, the recovery winch attachment 104 may not move laterally (or substantially laterally) along the shackle pin 108.

Figure 5:
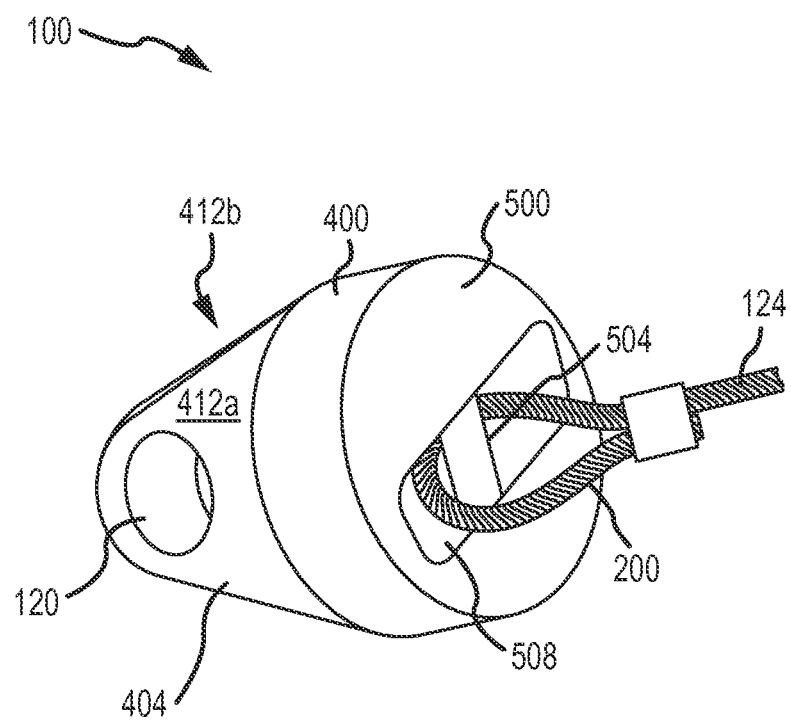
FIG. 5 is a reverse perspective view of the recovery winch attachment shown in FIG. 1.

FIG. 5 is a reverse angle view of the recovery winch attachment 100 shown in FIG. 4. As shown in FIG. 5, the recovery winch attachment 100 includes a base 404 and a shackle attachment tab 404 connected to the base 400. As mentioned above, the base 400 and the shackle attachment tab 404 may be integrally formed as a single piece of homogenous material. In accordance with alternative embodiments, the base 404 is a separate piece, detachable from the shackle attachment tab 404. As can be seen in FIG. 5, the recovery winch attachment 100 includes a fairlead engagement surface 500. The fairlead engagement surface 500 is disposed on the opposite side of the base 400 from that of the first side 408 of the base 400. The fairlead engagement surface 500 contacts the fairlead 236 when the recovery line 124 is retracted and stowed. When the recovery winch attachment 100 is tightly pulled onto the fairlead 136, the recovery line 124 does not loses tension after stowage. Then the shackle pin cannot come loose and fall out resulting in the loss of the shackle and danger to other drivers on the road. Thus, by attaching the recovery winch attachment 100, a safe centered shackle mounting interface is created while providing a positive cable stop against the fairlead.

As can also be seen in FIGS. 5, 11A, and 11B, the recovery winch attachment 100 includes a void space 508 within the base 404. The void space 508 includes a recessed portion or empty space that is recessed from the fairlead engagement surface 500. Also shown in FIGS. 5 11A, and 11B, is a retention member 504 which is set within the base 400 of the recovery winch attachment 100. The retention member 504 intersects with the void space 508 at a right angle. The retention member 504 and the void space 508 together form a retention mechanism that is configured to retain the loop end 200 of the recovery line 124. Specifically, the recovery line 124 intersects with the fairlead engagement surface 500 such that the loop end 200 encircles the retention member 504 and sits at least partially within the void space 508. The orientation of the retention member 504 may be vertical, horizontal or angular with relation to the plane of the shackle mounting tab. In accordance with one embodiment discussed herein, the retention member 504 is a integral machine boss that is not removable from the base 400 of the recovery winch attachment 100. Alternatively, the retention member 504 may be a shear pin which sits within a shear pin cavity and may be removed from the base 400 if needed.

Figure 6:
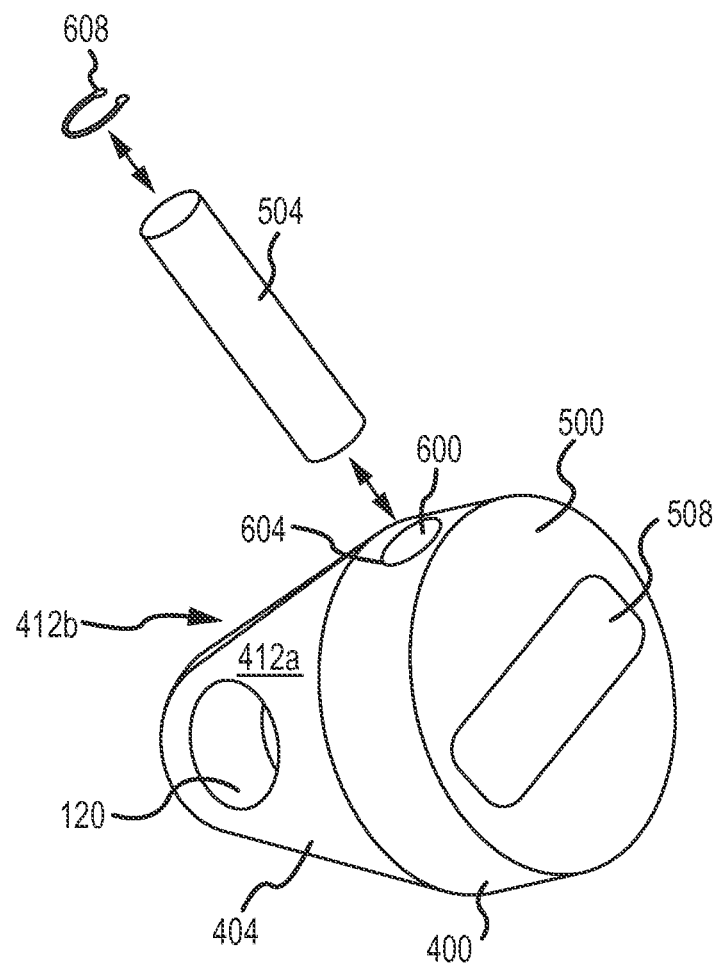
FIG. 6 illustrates a recovery winch attachment in accordance with embodiments discussed herein that includes a removable shear pin retention member.

FIG. 6 illustrates a recovery winch attachment 100 that includes a removable shear pin 504 retention member. FIG. 6 is an exploded view of the recovery winch attachment 100 with the shear pin 504 removed. Also shown in FIG. 6 is a shear pin cavity 600 that terminates in an opening 604 at an exterior surface of the base 400. In connection with a removable shear pin 504, the recovery attachment 100 may additionally include a circular cotter pin 608 that sits within the shear pin cavity 600 between the shear pin 504 and the opening 604 such that the shear pin 504 is retained within the shear pin cavity 600.

Figure 7:
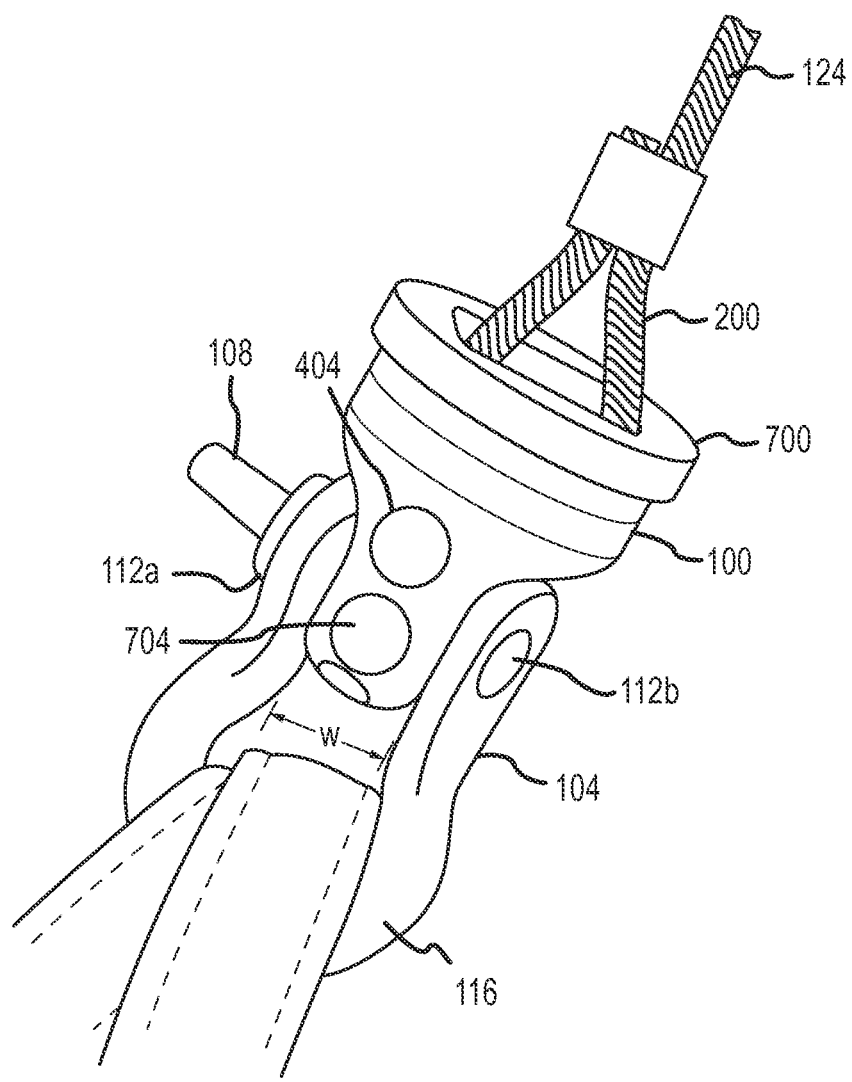
FIG. 7 is an illustration of an operation of a recovery winch attachment in accordance with embodiments discussed herein.

FIG. 7 is an illustration of the recovery winch attachment in operation. In FIG. 7, the recovery winch attachment 100 is connected to the recovery line 124 through the retention member 504. The recovery winch attachment 100 is additionally connected at its opposite end to a shackle 104 which in turn is connected to a recovery strap 708. The recovery strap may be attached to a tree or other fixed point not shown in the FIG. 7. The u-shaped portion 116 of the shackle 104 is adapted to provide a connection point for a towing strap or other recovery strap. The recovery strap may be looped around a tree or other solid point of attachment and the ends of the recovery strap connected to the u-shaped portion 116 of the shackle 104. The shackle is then connected to the recovery winch attachment 100, which provides a mechanism for removing the off-road vehicle 132 from a position from which the vehicle can not move under its own power. Specifically, once the recovery strap is attached around the tree or other fixed point, the winch 128 engages and withdraws the recovery line 124 into the fairlead 136 and thereby moves the off-road vehicle 132 out from a ditch or other hazard in which the vehicle may be stuck. In this way, the off-road vehicle 132 moves toward the tree or other fixed point to which the recovery strap is connected. As can be seen in FIG. 7, the width W of the attachment tab 404 extends between the first and second shear pin eyelets 112*a,b*. Here, the surfaces of the shear pin eyelets 112*a,b* are flush with the shear pin engagement surfaces 412*a,b*. In this configuration, the recovery winch attachment 100 may not significantly laterally move (e.g., from side to side) with along the shackle pin 108.

As can be seen in FIG. 7, the recovery winch attachment 100 may additionally include a padding 700. The padding 700 provides a cushion for the fairlead 136 when the recovery line 124 is retracted within the fairlead 136. FIG. 7 additionally shows one or more depressions or dimples 704 on the outside surface of the shackle attachment tab 404. The dimples 704 provide a gripping area operable to allow an operator to retain a better grip on the recovery attachment 404.

Figure 8:
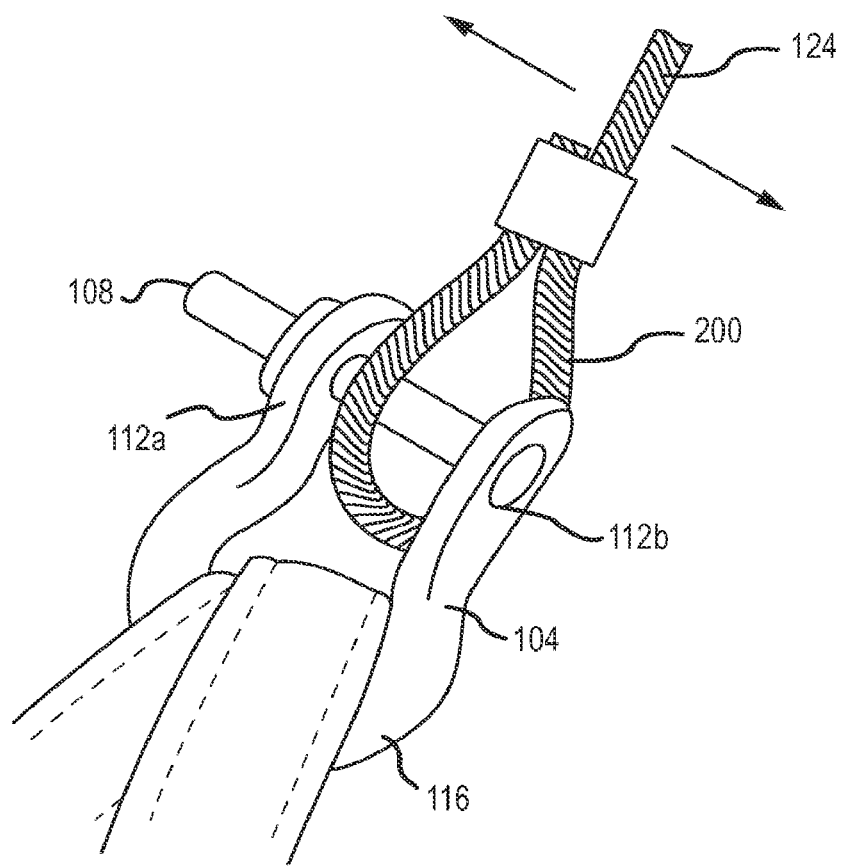
FIG. 8 shows a prior art recovery configuration wherein a recovery line is connected directly to a shackle.
Figure 10:
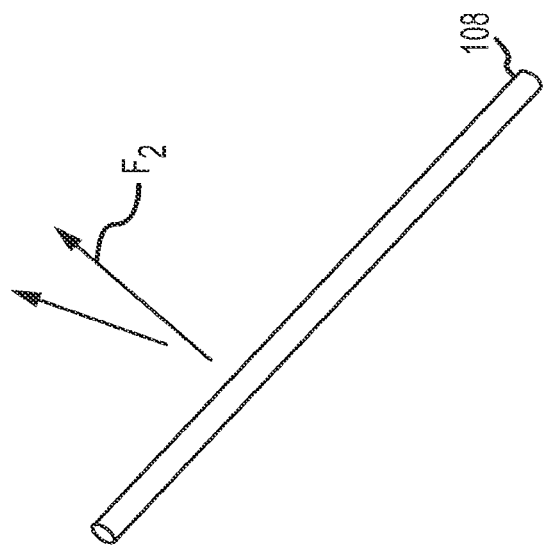
FIG. 10 shows an illustration of forces generated by a prior art recovery configuration.

FIG. 8 shows a prior art configuration in which the recovery line 124 is connected directly to the shackle 104. Specifically, the shackle pin 108 is threaded directly through the loop end 208 as can be seen in FIG. 8. This prior art configuration allows lateral movement of the loop end 208 along the length of the shackle pin 108. This lateral movement of the loop end 208 may result in an off-center loading of the shackle pin. There are several problems encountered when doing this. The cable eye can slip back and forth on the shackle pin allowing the pulling force to be non centered on the shackle pin and forged bow cross section. This type of non centered loading can decrease the load rating of the shackle. Further, in certain cases the cable eye may be too small to fit a shackle pin therethrough. A comparison between forces generated by embodiments discussed herein and the forces generated in the prior art configuration is shown in FIG. 9 and FIG. 10.

In addition, the cable eye generally must be fed through the fairlead in such a manner that the cable eye is flattened and thus parallel to the ground. When a shackle installed in a cable eye is stowed, the flat orientation of the cable eye may prevent the shackle from being snugly or firmly stored against the fairlead as both the shackle and fairlead typically have rounded surfaces. Thus, the shackle may come loose when the vehicle is in motion, or rattle about. Similarly, in the case of a hawse fairlead adjacent a shackle secured to a cable eye, the rounded portion of the shackle may dig into and damage the flat surface of the fairlead as the shackle moves.

Figure 9:
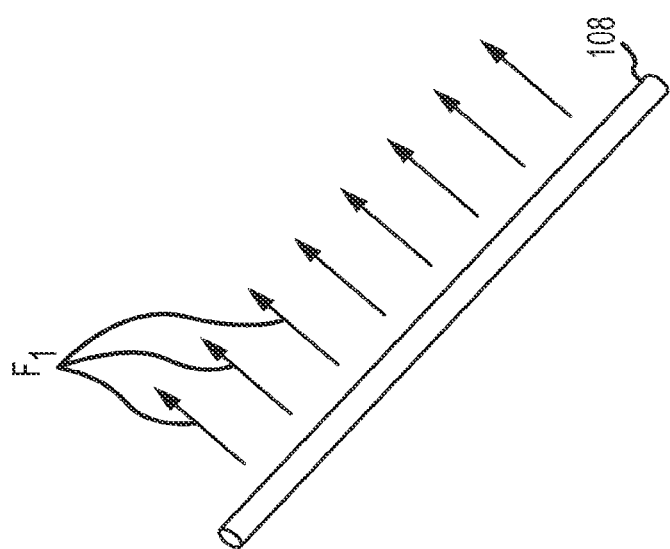
FIG. 9 shows an illustration of forces generated by a recovery winch attachment in accordance with embodiments discussed herein.

FIG. 9 shows an illustration of the force generated by embodiments discussed herein. Specifically, as the shackle pin attachment tab 404 pulls evenly along the length of the shackle pin 108, an even distribution of force loads the shackle pin 108. In comparison, as shown in FIG. 10 the prior art configurations allows the loop end 200 to travel along the length of the shackle pin 108. In this orientation, the loop end 200 pulls on that portion of the shackle pin 108 that it contacts, and not on other portions of the shackle pin 108. This unbalanced loading results in force F2 at various points along the shackle pin 108. This may result in bending or bowing of the shackle pin 108.

The advantages of the present invention include, without limitation, that the winch owner is not limited to a hook as a means to secure the end of the cable or rope. The invention provides a means to safely mount a standard rigging shackle to a common cable or rope loop. The shackle is a safer and stronger device for holding any mating cable or strap or chain. The shackle pin provides a means to trap and secure any mating cable or strap or chain. The invention also provides a positive stop to the cable or rope by allowing the owner to cinch the invention tight against the winch fairlead when the winch is not in use. The invention also provides a centered load path for the shackle. This is not the case when a shackle is simply installed onto a cable or rope loop without the invention. Because of the vast possible variations of the overall shape and look of the invention, the invention should not be limited by the included sketches, examples and methods but by all of the embodiments and methods within the scope and spirit of the invention as claimed.

The foregoing merely illustrates certain principles of embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, contain the principles of the embodiments and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A recovery winch attachment comprising
 a base having a fairlead engagement surface and defining a void space within the base, wherein the void space is defined on one side by a plane established by the fairlead engagement surface;
 a shear pin extending across the void space and configured to retain a recovery line at least partially within the void space of the base; and
 a shackle attachment tab connected to the base and extending outwardly from a side of the base opposite from that of the fairlead engagement surface, wherein
 the shackle attachment tab further comprises a first shackle engagement surface substantially perpendicular to the plane established by the fairlead engagement surface and a second shackle engagement surface substantially parallel to the first shackle engagement surface;
 the shackle attachment tab is centered within a boundary defined by the fairlead engagement surface; and
 a longitudinal axis of the shear pin is parallel to the first and second shackle engagement surfaces.

2. The recovery winch attachment of claim 1, wherein
 the shackle attachment tab defines a mounting hole that extends between the first and second shackle engagement surfaces through a thickness of the shackle attachment tab, the mounting hole configured to receive a shackle pin of a shackle; and
 an axis of the mounting hole is perpendicular to the first and second shackle engagement surfaces.

3. The recovery winch attachment of claim 2, wherein the thickness of the shackle attachment tab substantially corresponds to a distance between first and second shackle pin eyelets of the shackle.

4. The recovery winch attachment of claim 2, wherein
the first shackle engagement surface is configured to be flush with a surface of a first shackle pin eyelet of the shackle when the mounting hole receives the shackle pin; and
the second shackle engagement surface is configured to be flush with a surface of a second shackle pin eyelet of the shackle when the mounting hole receives the shackle pin.

5. The recovery winch attachment of claim 1, wherein the shear pin sits in a shear pin cavity within the base, the shear pin cavity intersecting with the void space at substantially a right angle.

6. The recovery winch attachment of claim 5, wherein one side of the shear pin cavity terminates at an opening in the base such that the shear pin may be removed from the shear pin cavity through the opening in the base.

7. The recovery winch attachment of claim 5, further comprising a removable cotter pin set within the shear pin cavity between the shear pin and the opening in the base such that the shear pin is retained within the shear pin cavity.

8. The recovery winch attachment of claim 1, further comprising a padding attached to the base at the fairlead engagement surface, the padding having a hole through which the recovery line passes.

9. The recovery winch attachment of claim 1, wherein the base and shackle attachment tab are integrally formed as a single piece of homogenous material.

10. The recovery winch attachment of claim 1, wherein the base is cylindrical and the fairlead engagement surface is circular.

11. The recovery winch attachment of claim 10, wherein a diameter of the fairlead engagement surface is at least twice as large as a fairlead opening.

12. A recovery winch attachment comprising:
a base having a fairlead engagement surface and defining an opening in the fairlead engagement surface;
a recovery line retention mechanism mounted within the base and recessed from a plane established by the fairlead engagement surface; and
a shackle attachment tab connected to and extending from a surface of the base entirely within a boundary of the surface, and defining a mounting hole that extends through a thickness of the shackle attachment tab between a first shackle engagement surface and a second shackle engagement surface parallel to the first shackle engagement surface;
wherein the recovery line retention mechanism is oriented with respect to the shackle attachment tab such that a plane containing a longitudinal axis of the recovery line retention mechanism is parallel to the first and second shackle engagement surfaces and intersects the mounting hole transverse to a longitudinal axis of the mounting hole.

13. The recovery winch attachment of claim 12, wherein
the first shackle engagement surface is substantially perpendicular to the plane established by the fairlead engagement surface and is configured to be flush with a surface of a first shackle pin eyelet when the mounting hole receives a shackle pin; and
the second shackle engagement surface is configured to be flush with a surface of the second shackle pin eyelet of a shackle pin.

14. The recovery winch attachment of claim 12, wherein the recovery line retention mechanism comprises a shear pin configured to retain the recovery line at least partially within a void space of the base, the void space defined on one side by a plane established by the fairlead engagement surface.

15. The recovery winch attachment of claim 12, wherein the recovery line retention mechanism comprises a machined boss integral with and not removable from the base and positioned at least partially within a void space of the base, the void space defined on one side by a plane established by the fairlead engagement surface.

16. A shackle mount apparatus comprising
a base having a planar engagement surface;
a retention mechanism mounted within the base and recessed from the planar engagement surface; and
an attachment tab connected to the base that extends outwardly from a side of the base opposite from that of the planar engagement surface, that is substantially bounded by a perimeter of the side of the base, and that defines a mounting hole extending through a thickness of the attachment tab between a first engagement surface of the attachment tab and a second engagement surface of the attachment tab, wherein
the second engagement surface is parallel to the first engagement surface and perpendicular to the planar engagement surface;
a lengthwise orientation of the retention mechanism is transverse to a longitudinal axis of the mounting hole; and
the lengthwise orientation of the retention mechanism is parallel to and aligned between the first and second shackle engagement surfaces.

17. The apparatus of claim 16, wherein the retention mechanism further comprises a shear pin set within a void space of the base, the void space defined on one side by the planar engagement surface.

18. The recovery winch attachment of claim 1, wherein the fairlead engagement surface defines an aperture bounded on all sides by the fairlead engagement surface open to the void space.

* * * * *